United States Patent [19]

Shima et al.

[11] 4,234,146
[45] Nov. 18, 1980

[54] FLAT TYPE CABLE SUSPENSION STRUCTURE

[75] Inventors: Eiji Shima, Yokohama; Masao Shimizu, Funabashi; Hiroshi Den, Yotsukaido, all of Japan

[73] Assignees: FEBS International, Ltd.; The Fujikura Cable Works, both of Tokyo, Japan

[21] Appl. No.: 941,474

[22] Filed: Sep. 12, 1978

[30] Foreign Application Priority Data

Mar. 14, 1978 [JP] Japan .................................. 53-28259

[51] Int. Cl.³ ............................................. E21F 17/02
[52] U.S. Cl. .................................. 248/63; 174/117 F; 191/12 R
[58] Field of Search ...................... 187/1 R; 191/12 R; 248/63, 68 R, 74 R, 58, 60; 174/117 F

[56] References Cited

U.S. PATENT DOCUMENTS

| | | | |
|---|---|---|---|
| 1,271,264 | 7/1918 | Barnard | 248/63 X |
| 3,315,042 | 4/1967 | Munck | 191/12 R |
| 3,344,888 | 10/1967 | Connelly et al. | 174/70 R |

FOREIGN PATENT DOCUMENTS 49-150696 12/1974 Japan .
51-73281 6/1976 Japan .
51-90094 7/1976 Japan .

Primary Examiner—J. Franklin Foss
Attorney, Agent, or Firm—Armstrong, Nikaido, Marmelstein & Kubovcik

[57] ABSTRACT

An improvement in a flat type cable suspension structure which comprises a support structure comprising an upper support member and a lower support member vertically spaced from the upper support member and fixedly secured with respect to the ground, and a flat type jacketed cable extending crosswise with the support structure. The flat type cable extends downwardly through the spacing between the upper and lower support members toward said lower support member in such a manner that one face of the cable has a portion abutting against the rear side of the upper support member and the other face of the cable has a portion abutting against the front side of said lower support member. An exposed extension stemming outwardly from a tension member buried in the jacket of the cable is securely hooked over and held in a tightly suspended state on a hanger member provided on the front side of the upper support member. The cable suspension structure can effectively prevent sway and swing of the flat type cable assembly so that it can maintain a stable suspension over a prolonged period of time.

7 Claims, 5 Drawing Figures

FLAT TYPE CABLE SUSPENSION STRUCTURE

The present invention relates in general to an improvement in a cable suspension structure, and more particularly to an improvement in a suspension structure of flat type insulated and jacketed feeder cable including therein reinforcement tension members which structure is especially useful for installation of a feeder cable for an elevator.

Conventionally, a suspension structure of a feeder cable including reinforcement tension wires for use in an electrically powered elevator system is known. In such a conventional structure, a predetermined number of feeder cables are secured at their respective end portions, in suspended fashion, to a suspension device mounted rigidly on the wall surface of an elevator hoistway through a plurality of reinforcement tension wires extending from the cable by the use of a number of wire clips or the like corresponding to that of the tension wires, and at their respective other end portions, in a like manner, to a suspension device fixed on the lower frame of an elevator cage. The feeder cables are bound into a firm bundle by a binding wire or the like for preventing swing and sway of the cables. However, in such a conventional suspension structure, since the suspension devices mentioned above are mounted rigidly or unadjustably at their locations with respect to the wall surface of a hoistway, it is impossible in practice to change the position of suspension, for example in a vertical and/or horizontal direction with respect to the side wall surface. In this respect, a difficulty is encountered when it is required to alter such suspension position with respect to the wall structure to some other place, for instance, in a vertical and/or horizontal direction due to an accidental error in the location of disposition of the suspension structure during construction, or due to unexpected obstacles such as projections on the wall structure. Moreover, since the predetermined number of feeder cables are merely bundled and each of the elevator feeder cables themselves has no firm fixation with respect to the ground, it is impossible in practice to prevent occurrence of possible sway and swing of the cables.

Accordingly, it is a primary object of the present invention to provide an improved and useful flat type insulated and jacketed cable suspension structure, which is free of the above-mentioned drawbacks as are experienced in the conventional flat type cable suspension structure.

The foregoing and other objects and features and advantages of the present invention will become more apparent when reading the following detailed description by way of preferred embodiments thereof in conjunction with the accompanying drawings in which.

In FIGS. 1 through 5, like parts or portions are designated by like numerals or characters.

Essentially, according to the present invention, there is provided an improvement in a flat type cable suspension structure which comprises:

(a) an upper support member;

(b) a lower support member vertically spaced from and rigidly connected to said upper support member; said upper support member and said lower support member being disposed in a vertical plane and fixedly secured with respect to the ground;

(c) a flat type jacketed cable extending in a substantially vertical direction and having on one face a portion abutting against the rear side of said upper support member and an opposite face a portion abutting against the front side of said lower support member; and (d) a tension member longitudinally extending and buried in the jacket of said flat type cable and having an exposed portion partially taken out of said jacket; said exposed portion of the tension member being secured to said upper support member, thereby holding the flat type cable in a suspended fashion.

The present invention will now be described in detail by way of preferred embodiments of the present invention with reference to the accompanying drawings.

Figure 1:
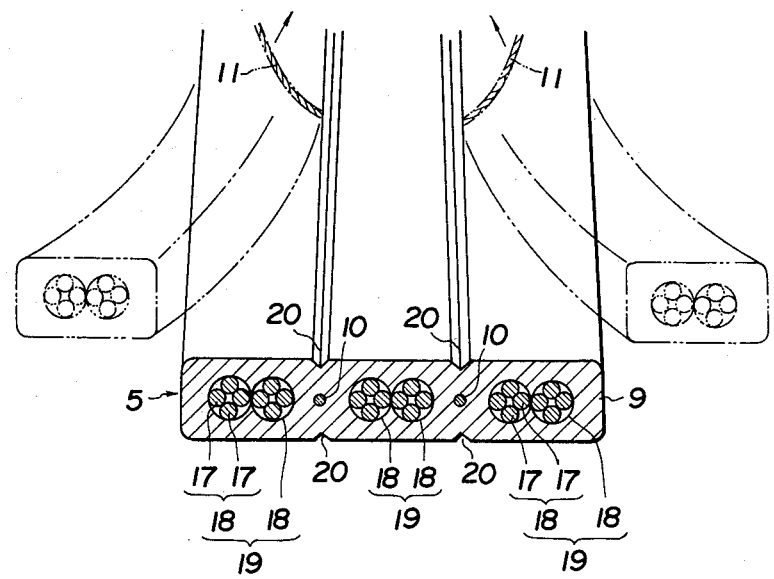
FIG. 1 is a perspective view showing a typical construction of a flat type jacketed cable adapted to be used in the flat type cable suspension structure of the present invention.

Referring now to FIG. 1, there is shown a typical construction of a flat type jacketed cable to which the present invention is applied. A plurality of core wires 17 are twisted together to form a core bundle 18. A plurality of the core bundles in turn form a group of core bundles 19, and a plurality of the thus formed groups of core bundles are arranged in parallel in a coplanar relation. Further, a plurality of tension members 10 of a high tensile strength material such as steel wire, fiber carbon, nylon and the like are disposed in parallel and each positioned in the middle of adjacent groups of core bundles 19. A plurality of such groups of core bundles 19 and tension members 10 are wholly covered by a jacket 9 of an insulating material such as rubber, synthetic resin or the like. On both sides of the jacket 9 there are provided grooves 20 longitudinally extending along the lines in which the tension members 10 are buried. Thus, there is formed a flat type jacketed cable 5 having a flat shape in cross section. The tension member serves not only as a reinforcement material for the jacketed cable but also as a means for holding the flat type cable in a suspended fashion as will be explained in detail later. By the use of the cable 5 of such a construction as described above, it is possible in practice for the tension members 10 to be burdened with a total tensile force acting on the entire body of the cable. Moreover, each group of core bundles 19 may be separated from adjacent ones to a single unit by forcibly pulling out the exposed ends 11 of the tension members 10 along the grooves 20 provided in the insulating jacket 9 toward the directions shown by arrows in FIG. 1 so that the jacket 9 is torn along the grooves 20.

Figure 2:
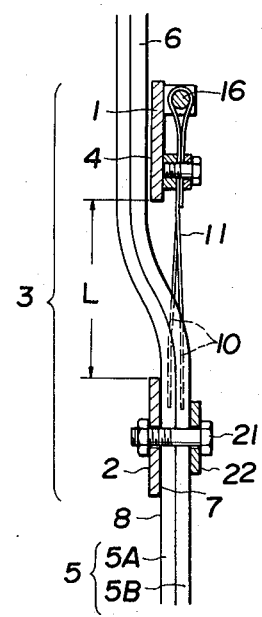
FIG. 2 is a side elevational view of one form of flat type cable suspension structure according to the present invention, partly shown in section.

Referring next to FIG. 2, there is shown one form of the flat type cable suspension structure according to the present invention. A support structure 3 comprises an upper support member 1 and a lower support member 2 vertically spaced from the upper support member 1 at a distance L. The members 1 and 2 are made of a rigid material such as steel. The support structure is fixedly secured with respect to the ground. A predetermined number of flat type cables (two in the drawings) 5A, 5B, etc. are thicknesswise laid one upon another to form a flat type cable assembly 5. The cable assembly 5 extends in a substantially vertical direction, and has at its one face 6 a portion abutting against the rear side 4 of the upper support member 1. The cable assembly 5 extends crosswise with the support structure 3 while extending downwardly through the spacing of a distance L toward the lower support member 2 in such a manner that the other face 8 of the cable assembly 5 has a portion abutting against the front side 7 of the lower support member 2. At the same time, the exposed extensions 11 stemming outwardly from the tension members 10 buried in the insulating jacket 9 of the cable 5 are securely hooked over and held in a tightly suspended state, on a hanger member 16 provided on the front side of the upper support member 1. The cable assembly 5 is urgedly contacted with the face 6 by means of a plate-like pressing member 22 which is secured to the lower support member 2 by means of bolts 21.

Figure 3:
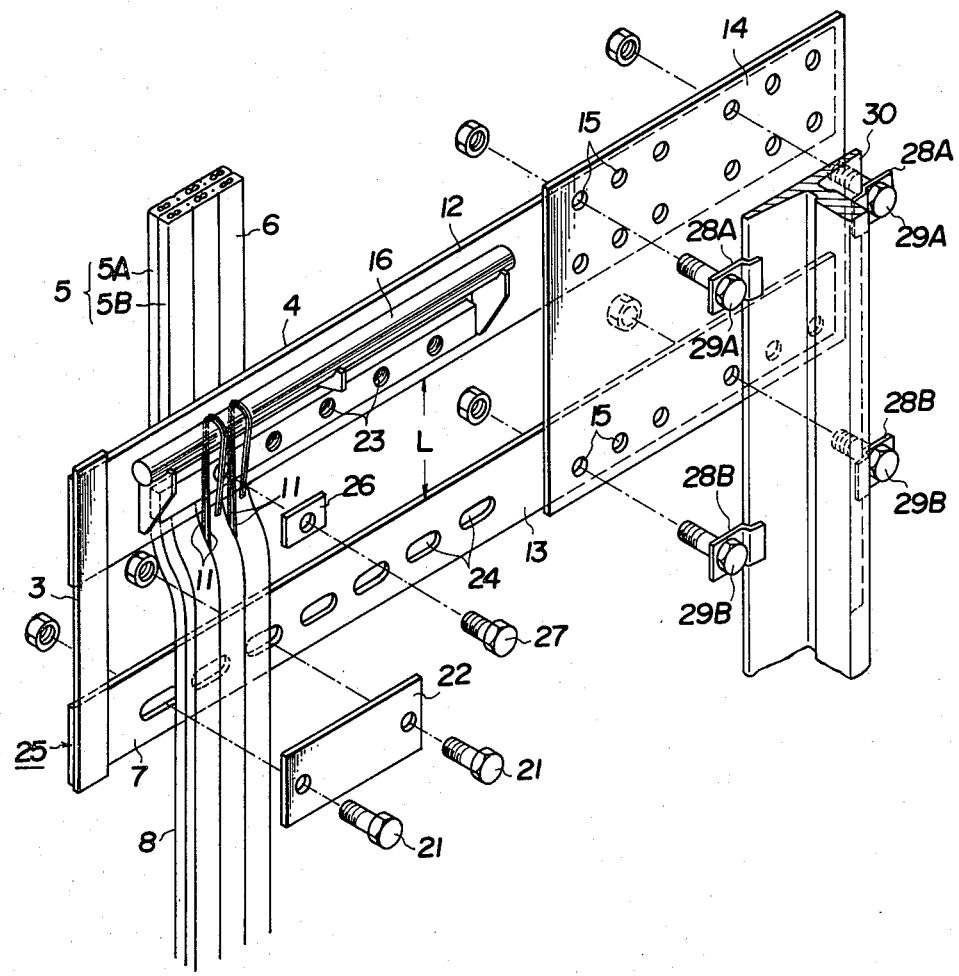
FIG. 3 is an exploded perspective view of a flat type cable suspension structure according to the present invention which is for use on the part of the side wall structure of an elevator hoistway.

Referring to FIG. 3, there is shown an illustrative manner for assembling a flat type cable suspension structure 25 of the present invention. As apparently seen in FIG. 3, two elongated members, that is, an upper support member 12 and a lower support member 13, both of which are made of steel and the like, are disposed in horizontal direction and in parallel with each other so that the both members are in the same vertical plane and have therebetween a spacing of a distance L. The upper support member 1 is connected to the lower support member 2 by a connecting means to form a support structure 3 which is fixedly secured with respect to the ground as will be explained later. A plurality of holes 15 are formed in a plate 14 and in the upper support member 12 and the lower support member 13 connected at their respective right portions through the plate 14 as viewed in FIG. 3. In the left portion (as viewed in FIG. 3) of the upper support member 12, there is a longitudinally extending a hanger member 16 which is securely attached to the upper support member 12 by means of brackets as depicted in FIG. 3. A predetermined number of flat type cables (two in the drawings) 5A, 5B, etc. are thicknesswise laid one upon another to form a flat type cable assembly 5. The cable assembly 5 extends in a substantially vertical direction, and has at its one face 6 a portion abutting against the rear side 4 of the upper support member 12. The cable assembly 5 extends crosswise with the support structure 25 while extending downwardly through the spacing of a distance L toward the lower support member 13 in such a manner that the other face 8 of the cable assembly 5 has a portion abutting against the front side 7 of the lower support member 13. At the same time, the exposed extensions 11 of tension member 10 stemming out of the jacket of the cable 5 are securely hooked over and held, in a tightly suspended state, on a hanger member 16 provided on the front side of the upper support member 12. In the part just below the hanger member 16, there are formed a plurality of threaded holes 23 for bolts 27 to be screwed thereinto at a predetermined interval in a longitudinal direction, while in the lower support member 13 there are formed a plurality of elongated holes 24 for bolts to be passed therethrough at a predetermined interval as depicted in FIG. 3.

With such arrangement of the flat type cable suspension structure 25 as mentioned above described with reference to FIG. 3, the cable assembly 5 has at its one surface 6 a portion abutting against the rear side 4 of the upper support member 12, while extending crosswise with the support structure 3 and extending downwardly through the spacing of a distance L toward the lower support member 13 in such a manner that the other face 8 of the cable assembly 5 has a portion abutting against the front side 7 of the lower support member 13. At the same time, each of the exposed extensions 11 of the tension members 10 stemming out of the jacket 9 of the cable assembly 5 is hooked over and hung by on the hanger member 16 so that it is securely held by the upper support member 12 in a tightly suspended state. The exposed tension members 11 are pressed, at their portions positioned below the hanger member 16, against the upper support member 12 by screwing a bolt 27 through the medium of a bored plate 26 into the threaded hole 23. On the other hand, the flat type cable assembly 5 is pressed, at one surface 8, against the lower support member 13 through the medium of a perforated plate 22 by the bolts 21 passing through the elongated holes 24 formed in the lower support member 13. Thus, a suspension structure of a flat type cable assembly composed of e.g. two constituent cables 5A and 5B is accomplished.

For fixedly securing the thus assembled structure to the rigid wall structure of the hoistway, a plurality of holes 15 formed in the connecting plate 14 of the support structure 25 are utilized. Through these holes 15 are inserted bolts 29A and 29B which are engaged with fixtures 28A and 28B, respectively. Two pairs of the fixtures 28A and 28B are each attached to the opposite edge portions of one of guide rails 30 for the elevator cage. The guide rail 30 is located at one corner of the hoistway. By securing the bolts 29A and 29B to the upper and lower support members 12 and 13 through the connecting plate 14, the cable suspension structure 25 for one end portion of the cable assembly 5 is now secured firmly to the guide rail 30.

Figure 4:
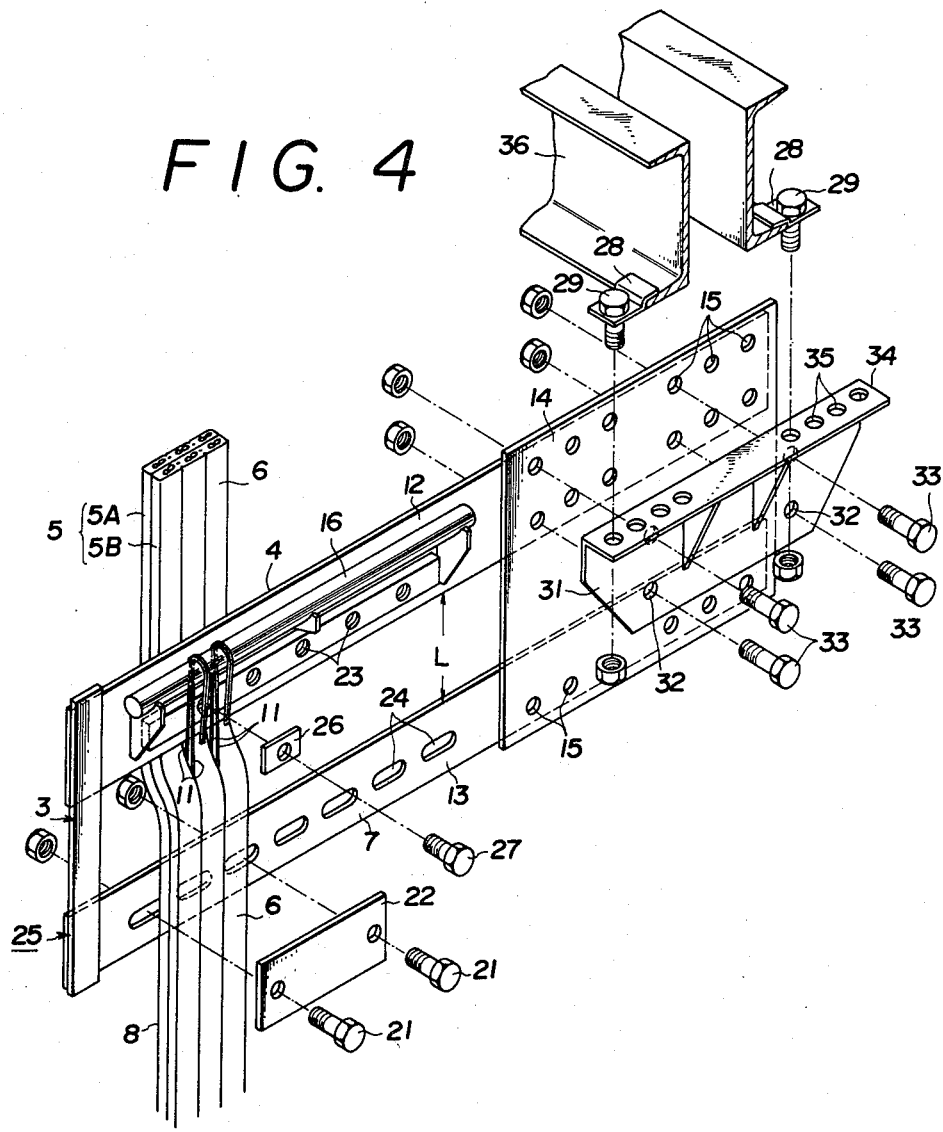
FIG. 4 is a similar view to FIG. 3, illustrating a flat type cable suspension structure according to the present invention which is for use on the part of the bottom structure of an elevator cage.

Referring to FIG. 4, there is shown a similar cable suspension structure 25 for use on the part of the bottom portion of the elevator cage. In order to mount the cable suspension structure 25 on the bottom frame 36 of the elevator cage, a connecting plate 14 is secured to the elevator cage at its bottom frame 36 through a mounting bracket 31. The mounting bracket 31 has a mounting section or flange 34 formed integrally with and extending perpendicularly from the vertical section. The bracket 31 has two pairs of holes 32, 32 formed in the vertical section, and two sets of holes 35 formed in the mounting section 34. The vertical section of the mounting bracket 31 is fitted over and fixedly secured to the connecting plate 14 by means of two pairs of bolts 33 passing respectively through the holes 32 and 15. A pair of fixture members 28 are attached respectively to lower flanges of the bottom frame 36 of the elevator cage. Each of the fixture members 28 has a hole for a bolt. The mounting section 34 of the bracket 31 is fitted over and fixedly secured to the lower flanges of the bottom frame 36 by means of a pair of bolts 29 passing through the fixture members 28 and the holes 35 as depicted in FIG. 4. Thus, the suspension structure 25 for the other end portion of the cable assembly 5 is fixed with respect to the elevator cage in a suspended fashion.

Figure 5:
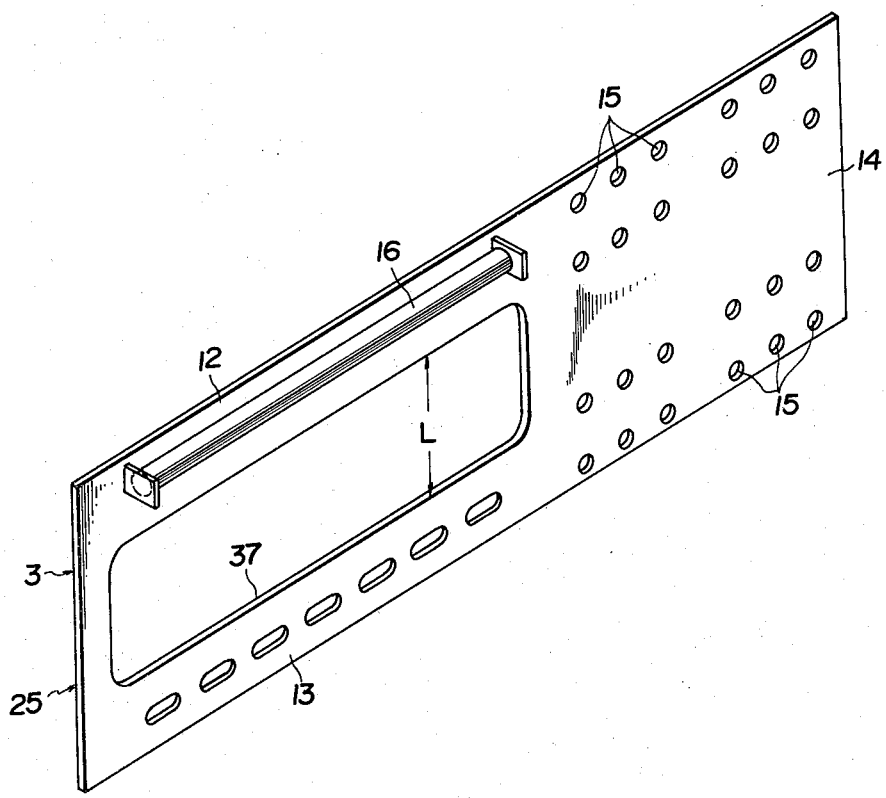
FIG. 5 is a perspective view showing another form of flat type cable suspension structure according to the present invention.

Referring to FIG. 5, there is shown a further embodiment of the present invention. According to the instant embodiment, a support structure 3 of a cable suspension structure 25 is constructed of a single plate of a rigid material such as steel. In the plate, there is formed a rectangular opening 37 having a vertical spacing of L. An upper part 12 above the opening 37 serves as the upper support member 12 as shown in FIG. 4. A lower part 13 below the opening 37 serves as the lower support member 13 as shown in FIG. 4. In the right extension 14 (as viewed in FIG. 5) of the support structure 3, there are provided a plurality of holes 15 for bolts passing therethrough. The holes 15 have the same function as that of the holes 15 shown in FIGS. 3 and 4 so that the cable suspension structure 25 can be fixedly attached with respect to the side wall structure of the hoistway and to the bottom of the elevator cage. Numeral 16 designates a hanger member 16 longitudinally extending over and securely attached to the upper part 12 by means of fixed brackets receiving both ends of the hanger member 16. The lower part 13 and a plurality of elongated holes formed therein have the same functions as those of the lower support member 13 and the holes 24 shown in FIGS. 3 and 4.

In practice of the present invention described by way of any of the embodiments, it is surely effective to prevent occurrence of occasional sway and swing of the flat type cable assembly 5 in either direction of its thickness or its width at the point of suspension by pressing one surface 8 of the cable 5 against the lower support member 2 shown in FIG. 2 (the lower support member 13 as shown in FIGS. 3 and 4) by means of the plate 22.

As described with reference to FIG. 2, in one aspect of the present invention, a support structure 3 comprising an upper support member 1 and a lower support member 2 vertically spaced from the upper support member 1 at a distance L is fixedly secured with respect to the ground. The cable assembly 5 extends in a substantially vertical direction, and has at its one face 6 a portion abutting against the rear side 4 of the upper support member 1. The cable assembly 5 extends crosswise with the support structure 3 while extending downwardly through the spacing of a distance L toward the lower support member 2 in such a manner that the other face 8 of the cable assembly 5 has a portion abutting against the front side 7 of the lower support member 2. At the same time, the exposed extensions 11 stemming outwardly from the tension members 10 capable of being burdened with the total force acting on the entire body of the cable 5 are securely hooked over and held in a tightly suspended state, on a hanger member 16 provided on the front side of the upper support member 1. Accordingly, it is easy in practice to assure the facial contact of the flat type cable assembly 5 with the lower support member 2, so that the facial contact portion of the cable assembly may be fixedly secured with respect to the ground. As a result, the cable suspension structure can effectively prevent sway and swing of the flat type cable assembly 5 so that it can maintain a stable suspension over a prolonged period of time. Further, it is noted that the upward end of the cable assembly 5 extending further upwardly from the rear side 4 of the upper support member 1 can readily be guided toward a junction box disposed on the surface of the side wall structure in the hoistway.

Moreover, in another aspect of the present invention, the hanger member 16 for hooking thereover the exposed extensions 11 of the tension members 10 extends longitudinally of the upper support member 12. Accordingly, it is possible to optionally select an optimum suspension point of the flat type cable assembly 5 by slidingly shifting the cable assembly in the lateral direction along the length of the hanger member 16 with respect to the hoistway structure. The provision of a plurality of holes 15 on the part of the extension 14 of the upper and lower support members 12 and 13 also enables the cable suspension structure to be readily mounted onto the rigid structures such as the guide rail 30 or the bottom structure 36 of the elevator cage by merely securing the extension 14 to the structure on the guide rail. Moreover, with respect to the cable suspension structure for use on the part of the side wall structure of the hoistway, it is possible in practice to adjust the suspension point or fixation of the extension 14 of the structure also in the vertical direction along the guide rail 30 as desired by changing the relative location of the extension 14 with respect to the guide rail. Consequently, there is now realized such advantageous combined effect as enables the cable suspension structure to be freely adjusted in location in either vertical or horizontal direction in the hoistway according to need.

What is claimed is:

1. An improvement in a flat type cable suspension structure which comprises:
    (a) an upper support member;
    (b) a lower support member vertically spaced from and rigidly connected to said upper support member; said upper support member and said lower support member being disposed in a vertical plane and fixedly secured with respect to the ground;
    (c) a flat type jacketed cable extending in a substantially vertical direction and having on one face a portion abutting against the rear side of said upper support member and on an opposite face a portion abutting against the front side of said lower support member;
    (d) a tension member longitudinally extending and buried in the jacket of said flat type cable having an exposed portion partially taken out of said jacket; and
    (e) means for securing said exposed portion of the tension member to said upper support member, thereby holding the flat type cable in a suspended fashion, said means being fixedly attached to said upper support member.

2. An improvement according to claim 1, wherein said means comprises a hanger member secured to and extending longitudinally of said upper support member, said hanger member having hooked thereover the exposed portion of the tension member.

3. An improvement according to claim 1, wherein said upper support member and said lower support member have respective extensions which have holes for receiving bolts passing therethrough for fixedly securing said upper and lower support members with respect to the ground.

4. An improvement according to claim 1, wherein said lower support member has a plurality of elongated holes arranged at predetermined intervals in the longitudinal direction, said improvement further comprising a perforated plate, and bolts therethrough connected to said lower support member through the elongated holes, said flat type cable being positioned between said perforated plate and the front side of said lower support member, thereby pressing the flat type cable against the front side of said lower support member.

5. An improvement according to claim 2, wherein said upper support member has a plurality of holes formed below the hanger member, said means further comprising a bore pressing plate, and bolts therethrough connected to said upper support member through the plurality of holes, the exposed extensions of the tension member being positioned between the pressing plate and the front side of the upper support member, thereby pressing the exposed extensions of the tension member against the front side of the upper support member at a position below said hanger member.

6. An improvement according to claim 1, wherein said upper support member is formed integrally with said lower support member, with the spacing therebetween being in the form of a rectangular opening formed in a single plate.

7. An improvement according to claim 1, wherein said flat type cable is composed of a predetermined number of constituent flat type cables multi-laid one upon another to form a flat type cable assembly.

* * * * *

UNITED STATES PATENT AND TRADEMARK OFFICE
CERTIFICATE OF CORRECTION

PATENT NO. : 4,234,146
DATED : November 18, 1980
INVENTOR(S) : SHIMA ET AL

It is certified that error appears in the above-identified patent and that said Letters Patent are hereby corrected as shown below:

[73] Assignees: FEPS International, Ltd.; The Fujikura Cable Works, both of Tokyo, Japan Signed and Sealed this Seventeenth Day of March 1981

[SEAL]

Attest:

RENE D. TEGTMEYER

Attesting Officer

Acting Commissioner of Patents and Trademarks